United States Patent [19]

Spiegel et al.

[11] Patent Number: 5,316,720
[45] Date of Patent: May 31, 1994

[54] LASER SHOCK AND SINTERING METHOD FOR PARTICULATE DENSIFICATION

[75] Inventors: Lyle B. Spiegel, Woodland Hills; William E. McDermott, Rancho Palos Verdes, both of Calif.

[73] Assignee: Rockwell International Corporation, Seal Beach, Calif.

[21] Appl. No.: 979,024

[22] Filed: Nov. 20, 1992

[51] Int. Cl.⁵ .............................. B22F 1/00
[52] U.S. Cl. ........................ 419/48; 419/53
[58] Field of Search ............ 148/565; 219/121; 419/48, 53

[56] References Cited

U.S. PATENT DOCUMENTS

| | | | |
|---|---|---|---|
| 3,850,698 | 11/1974 | Mallozzi et al. | 148/565 |
| 4,401,477 | 5/1982 | Clauer et al. | 148/565 |
| 4,717,627 | 12/1986 | Nellis et al. | 428/552 |
| 5,089,467 | 7/1987 | Murr et al. | 505/1 |

Primary Examiner—Donald P. Walsh
Assistant Examiner—Anthony R. Chi
Attorney, Agent, or Firm—H. Frederick Hamann; Harry B. Field; Steven E. Kahm

[57] ABSTRACT

The present invention describes a process for the compaction and densification of discrete powder materials utilizing a high amplitude stress wave which produces a high pressure condition at a surface of the particles thereby driving said stress wave into and through the particles.

6 Claims, 1 Drawing Sheet

LASER SHOCK AND SINTERING METHOD FOR PARTICULATE DENSIFICATION

BACKGROUND OF THE INVENTION

The present invention relates generally to the field of high pressure processing of materials. More particularly, this invention relates to a method for the compaction and consolidation of discrete powder particles using application of high pressure in combination, as appropriate, with application of high temperatures for short periods of time, and, further relates to novel articles of manufacture produced thereby.

Previous methods for the shock processing of solid materials including discrete powder particles utilized high explosive materials in contact with the article, or high explosive materials utilized to accelerate a plate which strikes the article imparting pressure shock thereto. However these methods are cumbersome and not always reproducible.

In addition, it is difficult to shock process non-planar surfaces and complicated geometries and the processes are difficult to automate and fail to meet some industrial needs, particularly in a process known as "hot isostatic pressing" or "HIP" which is commonly used to compress powders into a fully dense, solid part or article.

Conventional HIP is commonly characterized as a "creep" process. Pressure is applied to force into tight union the various surfaces to be bonded. Heat is applied to increase the molecular motion of the proximate surfaces, leading to diffusion of one surface into another. This mass diffusion resulting from molecular interpenetration of surfaces held together by pressure leads to fully dense, chemically bonded materials typical of HIP processing. However, conventional HIP processing requires hours at elevated temperature and pressure for adequate mass diffusion and densification to occur; that is, for the surfaces to "creep" together.

The present invention describes a method in which pulsed lasers are used to densify powder or particulate materials for subsequent processing such as in HIP processing.

SUMMARY AND OBJECTS OF THE INVENTION

A typical method according to the present invention for densification of discrete powder particles comprises attaching to a surface of the article a layer of solid overlay material, and directing a radiation pulse of high power density to the layer of overlay material effecting thereby full compaction and densification of the underlying powder particles. The densified article resulting may then be further processed such as in a HIP procedure to complete the manufacturing steps.

The basic object of this invention is to process an article of manufacture or workpiece with pressure induced from the output of a high power pulsed laser to locally produce a short high amplitude pressure pulse and localized heating at the surface of the powder particulate material defining a "green" workpiece which may then be sintered in the solid state rendering a finished article of manufacture.

Another object of the present invention is to produce novel material having novel properties.

These and other objects and advantages of the present invention will become apparent from the following description of the preferred embodiment.

DESCRIPTION OF THE PREFERRED EMBODIMENT

Figure 1:
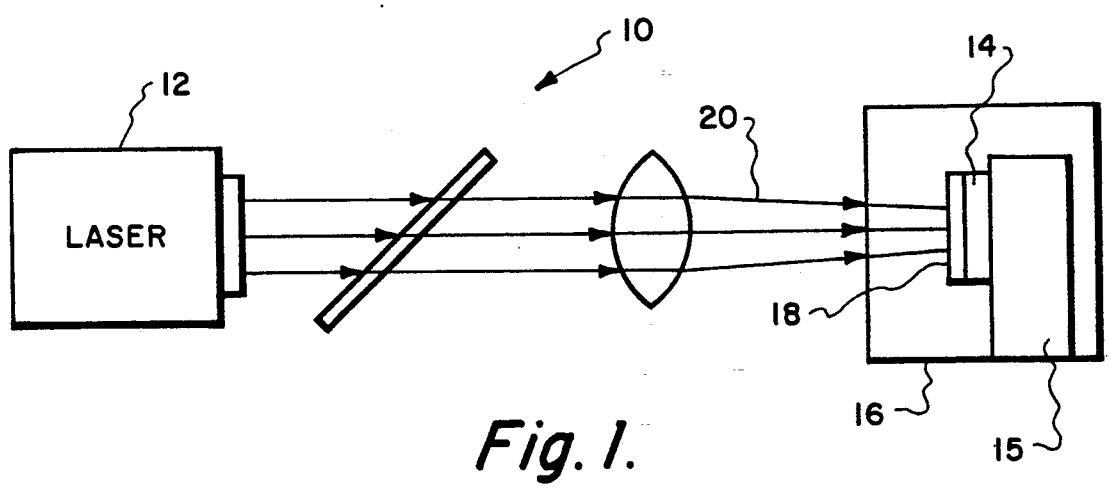
FIG. 1 is a schematic view illustrating an embodiment of the present invention.

FIG. 1 schematically illustrates apparatus 10 suitable for practicing the method according to the present invention for forming an article of manufacture in a preliminary processing step wherein densification of discrete powder particles with a laser generated high power density pressure pulse is occasioned. This method comprises (a) generating a pressure pulse of high power density with a laser 12, (b) producing a high pressure condition at a surface of powder, e.g. metallic particles 14, contained in a housing 16, thereby driving a high amplitude stress wave into and through the metal particles (c) densifying the particles by the effect of the imparted high amplitude stress wave, and (d) further heating the surface of the particles via light absorption.

In this process, a layer of solid overlay material 18 is positioned so as to be in intimate surface contact throughout the area to be radiated and a radiation pulse 20 of high power density is directed to the material by a laser. The use of an overlay makes it possible to achieve pressures in the gigapascal (GPa) range (1 GPa = 145,000 psi) with duration times of several nanoseconds. Various overlay materials that may be used in accordance with the present invention include glass, quartz, sodium silicate, fused silica, potassium chloride, sodium chloride, polyethylene, a fluoroplastic; nitrocellulose or mixtures thereof; PETN (pentaerythritol tetranitrate); bismuth, lead, cadmium, tin, or zinc. A typical overlay is about 50 to 20,000 micrometers thick. In addition, a solid underlay or backing material 15 may be utilized, which material is a suitable acoustic or stress wave damping material.

The pressure wave acts on the powder to drive the individual particles into intimate contact, such that plastic deformation takes place and a partially densified "green" compact condition is created in the laser targeted region. To achieve desired results, it may be necessary to utilize a series of laser pulses, with parameters selected to produce a particular pressure pulse amplitude and shape. Moreover, the laser beam can be shaped or masked as required, to produce compaction only in defined areas, enabling the construction of internal passages or other complex features. If necessary, preheating of the particulate material or powder can be incorporated as part of the method.

After the particles in each layer are added to the article being made by laser shocking, the article being made is subjected to sintering, such as by a hot isostatic pressing, to force the added material into tight union with the various surfaces to be bonded.

To manufacture an article using this process layers are built up one at a time, first by adding a powder to the surface, laser shocking the surface and then sintering. The process is repeated layer by layer until the desired article is made.

Although the present invention has been described in terms of a preferred embodiment, one of ordinary skill in the art will recognize that departures may be made while remaining within the spirit of the present invention. The scope of the present invention is therefore to be determined by the claims and their equivalents.

What is claimed is:

1. A method of forming an article of manufacture comprising:
   (a) generating a pressure pulse with a laser;
   (b) producing a pressure condition at a surface of discrete powder particles, thereby driving a stress wave into and through the particles;
   (c) heating a surface portion of said discrete powder particles via partial absorption by said particles of a laser generated beam; and
   (d) densifying the particles by the effect of the imparted stress wave and surface heating;
   (e) sintering the article.

2. A method of claim 1 wherein an overlay is placed over at least a portion of said surface of said particles to increase the stress wave.

3. A method of claim 1 wherein an acoustic material is positioned adjacent said discrete powder particles to damp said stress wave passing through said particles.

4. A method of forming an article of manufacture comprising densifying discrete powder particles with a laser generated pressure pulse and then sintering the article.

5. A method of claim 1 wherein the sintering is by hot isostatic pressing.

6. A method of claim 4 wherein the sintering is by hot isostatic pressing.

* * * * *